United States Patent
Hwang et al.

(10) Patent No.: US 11,391,516 B2
(45) Date of Patent: Jul. 19, 2022

(54) COLD CRUCIBLE COMPRISING METAL OXIDE BARRIER AND METHOD FOR MANUFACTURING SAME

(71) Applicant: KOREA HYDRO & NUCLEAR POWER CO., LTD, Gyeongsangbuk-do (KR)

(72) Inventors: Young Hwan Hwang, Daejeon (KR); Seok Ju Hwang, Daejeon (KR); Cheon Woo Kim, Daejeon (KR)

(73) Assignee: KOREA HYDRO & NUCLEAR POWER CO., LTD, Gyeongsangbuk-do (KR)

( * ) Notice: Subject to any disclaimer, the term of this patent is extended or adjusted under 35 U.S.C. 154(b) by 488 days.

(21) Appl. No.: 16/462,189

(22) PCT Filed: Nov. 20, 2017

(86) PCT No.: PCT/KR2017/013174
§ 371 (c)(1),
(2) Date: May 17, 2019

(87) PCT Pub. No.: WO2018/097553
PCT Pub. Date: May 31, 2018

(65) Prior Publication Data
US 2019/0331422 A1   Oct. 31, 2019

(30) Foreign Application Priority Data
Nov. 25, 2016 (KR) .......... 10-2016-0158328

(51) Int. Cl.
*H05B 6/22* (2006.01)
*F27D 11/12* (2006.01)
(Continued)

(52) U.S. Cl.
CPC .............. *F27D 11/12* (2013.01); *C01B 33/42* (2013.01); *C01F 7/02* (2013.01); *C01G 25/02* (2013.01);
(Continued)

(58) Field of Classification Search
CPC .... H05B 6/16; H05B 6/24; H05B 6/28; C04B 35/10; C04B 35/48; G21F 9/305;
(Continued)

(56) References Cited

U.S. PATENT DOCUMENTS 4,622,679 A * 11/1986 Voss .................... H05B 6/24
                                                373/156
4,738,713 A *  4/1988 Stickle ................... C22B 9/04
                                                373/156
(Continued)

FOREIGN PATENT DOCUMENTS

JP   U60-69997    5/1985
JP   2517642      11/1992
(Continued)

OTHER PUBLICATIONS

Korean Notice of Allowance, Application No. KR 10-2016-0158328, dated Mar. 28, 2018, 3 pages.
(Continued)

*Primary Examiner* — Hung D Nguyen
(74) *Attorney, Agent, or Firm* — Occhiuti & Rohlicek LLP

(57) ABSTRACT

A metal oxide barrier and a connecting method for solving the problems in which sectors of an existing cold crucible are connected by means of a mica plate and the mica plate is damaged due to arcing and the like and in which the sectors are strongly connected by means of the mica plate and thus are difficult to replace and maintain. A cold crucible, comprising a metal oxide barrier, according to the
(Continued)

present invention can prevent arcing, enables reduction of damage on the edge part of a water cooling sector due to a molten material and thus enhances durability. Moreover, the metal oxide barrier can easily be replaced compared to an existing mica plate and thus enables easy maintenance and repair.

17 Claims, 2 Drawing Sheets

(51) Int. Cl.
| | |
|---|---|
| *C01B 33/42* | (2006.01) |
| *C01F 7/02* | (2022.01) |
| *C01G 25/02* | (2006.01) |
| *F27B 14/06* | (2006.01) |
| *F27D 1/00* | (2006.01) |
| *F27D 1/12* | (2006.01) |
| *G21F 9/30* | (2006.01) |
| *H05B 6/28* | (2006.01) |
| *F27B 14/08* | (2006.01) |
| *F27B 14/10* | (2006.01) |
| *F27D 9/00* | (2006.01) |

(52) U.S. Cl.
CPC .............. *F27B 14/061* (2013.01); *F27D 1/00* (2013.01); *F27D 1/12* (2013.01); *G21F 9/305* (2013.01); *H05B 6/28* (2013.01); *F27B 2014/0837* (2013.01); *F27B 2014/0843* (2013.01); *F27B 2014/108* (2013.01); *F27D 2001/0046* (2013.01); *F27D 2009/001* (2013.01)

(58) Field of Classification Search
CPC ... F27D 1/00; F27D 1/12; F27D 11/06; F27D 11/12; F27D 2009/001; F27D 2001/0046; C01G 25/02; C01B 33/42; C03B 5/021; C03B 5/43; F27B 14/06; F27B 14/061; F27B 14/063; F27B 14/08; F27B 14/14; F27B 2014/0837; F27B 2014/0843; F27B 2014/108; C01F 7/02
USPC .......................................... 373/138, 151–158
See application file for complete search history.

(56) References Cited

U.S. PATENT DOCUMENTS

| | | | |
|---|---|---|---|
| 5,109,389 A * | 4/1992 | Stenzel | ................ F27B 14/063 |
| | | | 373/154 |
| 2005/0129087 A1 | 6/2005 | Brun et al. | |
| 2013/0235896 A1 | 9/2013 | Kim et al. | |

FOREIGN PATENT DOCUMENTS

| | | | |
|---|---|---|---|
| JP | 2573450 | | 7/1993 |
| JP | 08323463 | | 12/1996 |
| JP | 10-115488 A | * | 5/1998 |
| JP | 10115488 | | 5/1998 |
| JP | 2001263620 | | 9/2001 |
| JP | 2005517148 A | | 6/2005 |
| JP | 2014501901 A | | 1/2014 |
| KR | 1020040077935 | | 9/2004 |
| KR | 1020130033264 | | 4/2013 |

OTHER PUBLICATIONS

Japanese Notice of Allowance dated Jul. 13, 2020 in JP Application No. 2019-547060.

* cited by examiner

COLD CRUCIBLE COMPRISING METAL OXIDE BARRIER AND METHOD FOR MANUFACTURING SAME

CROSS REFERENCE TO RELATED APPLICATIONS

This application is a National Phase under 35 U.S.C. 371 of International Application No. PCT/KR2017/013174 filed on Nov. 20, 2017, which claims priority to Korean Application No. 10-2016-0158328 filed on Nov. 25, 2016.

TECHNICAL FIELD

The present invention relates to a cold crucible containing a metal oxide barrier and a method thereof, and more specifically, to a technology which enables easy replacement while preventing a barrier from damage due to introduction of impurities, etc. between metal sectors.

BACKGROUND ART

More stable treatment, storage, and management of hazardous waste, especially radioactive waste from nuclear power generation, etc. is a very important issue. As a method for treating such hazardous waste, various techniques (e.g., compression, incineration, cement solidification, etc.) have been applied, however, each technique had problems of a volume reduction ratio, a high possibility of secondary damage (e.g., leachate, etc.). Meanwhile, among the methods for treatment and storage of hazardous wastes, technologies for low crucible vitrification, in which hazardous waste is burnt using the cold crucible induction melter (CCIM) and heavy metals are melted and prepared into a vitrified body with glass, confined within a glass structure, and isolated from the surrounding environment so as not to be leached, have been developed being centered on some countries.

In a conventional cold crucible of a vitrification equipment, it was common that sectors were bonded via a mica plate. In a case where sectors were bonded by a mica plate alone, an arcing phenomenon occurred when impurities were introduced into a cold crucible, resulting in a problem of damaging the mica plate. Once the mica plate is damaged as such, a molten material can penetrate between sectors, and a repetition of this process can have a serious negative effect on the stability of a cold crucible.

In addition, conventionally, since sectors were strongly bonded by a mica plate, there was a problem in that in a case where there was damage on a mica plate, it was difficult to replace and maintain the mica plate.

DISCLOSURE

Technical Problem

An object of the present invention is to solve the problem that the binding between sectors of the existing cold crucibles was established by a mica plate and thus the mica plate was damaged by arcing, etc. Another object of the present invention is to solve the problem that the sectors were strongly bound by a mica plate and thus there was a difficulty in replacement and maintenance of the mica plate.

Technical Solution

The object of the present invention can be achieved by a cold crucible including a barrier disposed between a first water cooling sector for forming a melting space in a cold crucible of a vitrification equipment and a second water cooling sector adjacent thereto, wherein: the barrier has a T-shaped horizontal cross-section, in which the T-shaped plate portion is directed to the inside of the melting space, and the T-shaped tip portion is coupled by insertion between the water cooling sectors, and a material includes a metal oxide.

The material of the metal oxide barrier may include at least one selected from $Al_2O_3$ and $ZrO_2$.

The cold crucible may further may include a mica plate disposed between the first water cooling sector and the second water cooling sector.

The mica plate may be disposed in a space between the first water cooling sector and the second water cooling sector, from an end of the metal oxide barrier to an outer end between the water cooling sectors, and the mica plate may be attached to the adjacent water cooling sectors.

The mica plate may have a thickness of 0.1 mm to 1 mm, which is the same as or thicker than that of the tip portion of the metal oxide barrier.

The cold crucible may further may include an inorganic adhesive layer between the metal oxide barrier and the water cooling sectors.

A cooling water pathway may be formed inside of the water cooling sectors.

In the metal oxide barrier, the width (w) of the plate portion may be in a range of 0.2 mm to 40 mm and the thickness (t2) of the plate portion may be in a range of 0.1 mm to 5 mm.

In the metal oxide barrier, the thickness (t1) of the tip portion may be in a range of 0.1 mm to 1 mm and the length (h) of the tip portion may be in a range of 0.1 mm to 20 mm.

The horizontal cross-section of a corner portion, where the tip portion and the plate portion of the metal oxide barrier meet with each other, may be in an outer arc shape having a radius of curvature in a range of 0.1 mm to 10 mm.

As another method to achieve the object of the present invention, there is provided a method for coupling a metal oxide barrier between water cooling sectors, which includes: preparing a water cooling sector to prepare a first water cooling sector and a second water cooling sector; attaching a mica plate to an outer part of the space between the first water cooling sector and the second water cooling sector with the mica plate disposed therebetween; and inserting a barrier, in which a tip portion of a T-shaped metal oxide barrier is inserted into an inner part of the space between the first water cooling sector and the second water cooling sector.

The method for coupling a metal oxide barrier between water cooling sectors may further include a step of applying an adhesive, in which an inorganic adhesive is applied to a tip portion of an oxide barrier and at least one selected from the inner parts of the space between the first water cooling sector and the second water cooling sector.

Advantageous Effects

The cold crucible including a metal oxide barrier and a method of preparing the cold crucible of the present invention have advantages in that a mica plate can be prevented from being damaged by an arcing phenomenon and, in a case where the barrier is damaged, the mica plate can be easily replaced and maintained and thus durability and stability of the cold crucible can be improved.

MODE FOR INVENTION

Reference will now be made in detail to the preferred embodiments of the present invention, examples of which are illustrated in the accompanying drawings.

The detailed description set forth below in connection with the appended drawings is a description of exemplary embodiments and the spirit of the present invention is not limited to the accompanying drawings.

A cold crucible for vitrification including a melting space consisting of a plurality of water cooling sectors is a device, in which glass is melted using an induction heating method by electricity and the waste added into the molten glass is incinerated and the remaining incineration residues are vitrified.

Water cooling sectors are electrically insulated from each other and shielded by induction coils of a cold crucible. It is preferred that an insulating layer be formed using an insulating member between water cooling sectors. Each water cooling sector is made of a metal material for induction heating and a cooling water pathway is formed inside thereof so as to prevent it from being heated above a certain temperature.

Figure 1:
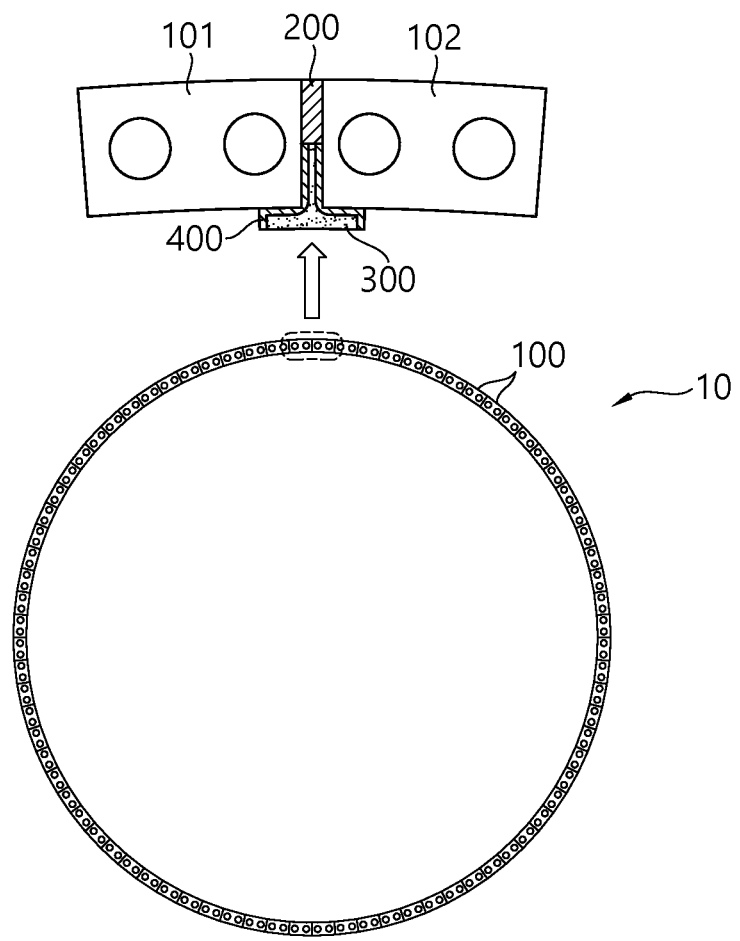
FIG. 1 is a cross-sectional view illustrating a barrier of a cold crucible according to an embodiment of the present invention.

FIG. 1 is a plan cross-sectional view and its enlarged cross-sectional view illustrating a cold crucible and an insulating layer structure according to an embodiment of the present invention. The melting space of a cold crucible 10 is formed by arranging a plurality of water cooling sectors 100 in the circumferential direction. As shown in FIG. 1, the water cooling sectors 100 of the present invention are coupled while including a mica plate 200 and a metal oxide barrier 300 therebetween.

The horizontal cross-section shape of a metal oxide barrier 300 is similar to a T shape as shown in FIG. 1. In the T shape, the plate portion corresponding to a head portion thereof is disposed inside of the melting space, that is, the plate portion is disposed such that a tip portion corresponding to a leg part of the T shape is coupled by insertion between a first water cooling sector 101 and a second water cooling sector 102, in a state being disposed in the melting space. The mica plate 200 may be disposed in the outer space that remains after the tip portion of the metal oxide barrier 300 is coupled by insertion between the first water cooling sector 101 and the second water cooling sector 102. In general, a mica plate 200 is coupled with the water cooling sectors 100.

The mica plate may have a thickness of 0.1 mm to 1 mm, and it is preferred that the thickness of the mica plate be the same as or greater than that of the tip portion of the metal oxide barrier. When the thickness of the mica plate is less than 0.1 mm, the strength of the mica plate becomes too weak and is thus easily damaged during the preparation of a cold crucible or the operation of a cold crucible, and additionally, there is a problem in that it is difficult to obtain sufficient insulation between the water cooling sectors. When the thickness of the mica plate is greater than 1 mm, the ratio of the water cooling sectors forming the melting space is lowered, and thus there is a possibility that the induction heating, etc. becomes inefficient.

The metal oxide barrier 300 has the primary purpose of preventing the damage caused by arcing during operation of a cold crucible, so that the damage caused by arcing can be minimized, and a metal oxide barrier is suitable so as to withstand the high temperature inside the cold crucible. In particular, it is preferred that a metal oxide barrier contain at least one selected from the group consisting of $Al_2O_3$ and $ZrO_2$ as an active ingredient in view of thermal shock, prevention of arcing damage, low thermal expansion, durability, etc.

The metal oxide barrier 300 must be coupled by attachment with the water cooling sectors 100 so that the melting space can be stably maintained. In order to couple the metal oxide barrier 300 between the water cooling sectors 100, an inorganic adhesive layer 400 is formed using an inorganic adhesive. The inorganic adhesive is not particularly limited as long as it can maintain the adhesive strength at the high temperature of the cold crucible after the attachment without causing deformation.

Figure 2:
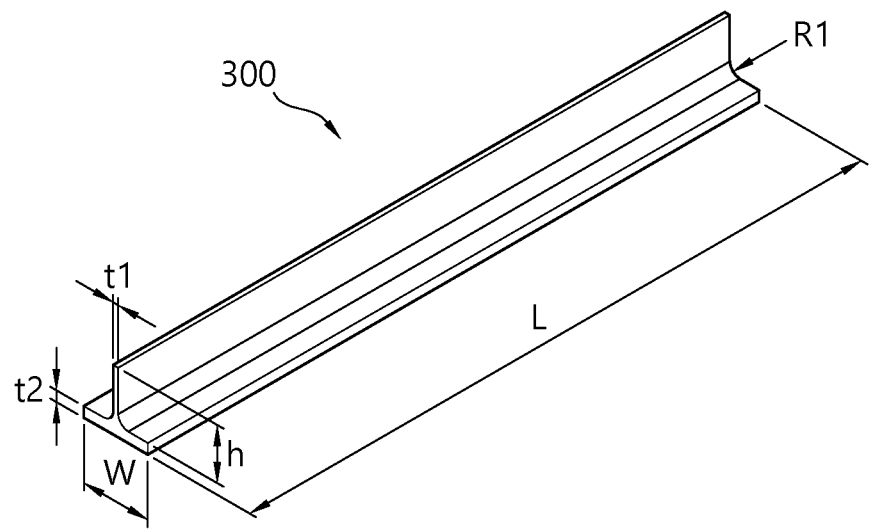
FIG. 2 is a perspective view illustrating a barrier according to an embodiment of the present invention.

FIG. 2 is a perspective view illustrating the shape of a metal oxide barrier 300 according to an embodiment of the present invention. The metal oxide barrier 300 coupled with the space between the water cooling sectors also has a longitudinal bar structure with a T-shaped horizontal cross-section because the water cooling sectors, when viewed in a vertical section, are in such a shape that a plurality of longitudinal cooling sectors are coupled to form a melting space.

It is preferred that the plate portion of a metal oxide barrier have a width (w) in a range of 0.2 mm to 40 mm and have a thickness (t2) in a range of 0.1 mm to 5 mm. The width of the plate portion is determined such that the edges of water cooling sectors are exposed to a melting space to prevent an arcing phenomenon. When the width of the plate portion exceeds 40 mm, the range of heating a molten material by water cooling sectors becomes too narrow, and thus the efficiency of the cold crucible operation is drastically lowered, whereas when the width of the plate portion is less than 0.2 mm, the edges of water cooling sectors are exposed and thus it becomes difficult to solve the problem of an arcing phenomenon.

The thickness of the plate portion was also determined to be in a range that enables the coupling while maintaining suitable strength. When the plate portion is formed to have a thickness of 5 mm or greater, the total volume occupying the melting space becomes larger thereby narrowing the melting space, whereas when the plate portion is formed to have a thickness of less than 0.1 mm, the plate portion can be easily broken even by a little shock due to the brittleness characteristic of a metal oxide.

It is preferred that the tip portion of the metal oxide barrier have a thickness (t1) in a range of 0.1 mm to 1 mm and the tip portion have the length (h) in a range of 0.1 mm to 20 mm. The reason for limiting the range of the tip portion thickness is similar to that for limiting the thickness of the mica plate 300. The range of the length is generally determined to be within the entire length of the space between water cooling sectors. For the improvement of the coupling strength between water cooling sectors, it is preferred that the ratio between the volume of the space occupied by the mica plate and the volume of the space occupied by the tip portion of the metal oxide barrier 300 in the space between the water cooling sectors be approximately 1:2 to 2:1. Since the structure in which a mica plate is coupled with the space between the water cooling sectors can maintain a certain space at the time of repair in the future, it becomes easy to replace the barrier by simple attachment/detachment in the future.

Additionally, as shown in FIG. 2, it is preferred that the horizontal cross-section of a corner portion where a metal oxide barrier tip portion and a plate portion meet is in an outer arc shape having a radius of curvature having a radius of curvature in a range of 0.1 mm to 10 mm. This is to reduce the possibility of easy breakage when the stress is concentrated on the corner between the plate portion and the tip portion, and it becomes easier to maintain the T shape of the tip portion and the plate portion when the outer arc shape is formed. When the curvature range of the outer arc shape is less than 0.1 mm, there is no difference from the shape in which the corner portion is vertical, thus increasing the possibility that the stress is concentrated and broken, whereas when the curvature is greater than 10 mm, the plate portion may come into close contact with water cooling sectors during the coupling between the water cooling sectors, thus preventing the coupling.

The present invention provides a method for coupling a metal oxide barrier, which includes: (a) preparing water cooling sectors of a first water cooling sector and a second water cooling sector such that their sides face with each other; (b) attaching a mica plate to an outer part of the space between the first water cooling sector and the second water cooling sector with the mica plate disposed therebetween; and (c) inserting a barrier, in which a tip portion of a T-shaped metal oxide barrier is inserted into an inner part of the space between the first water cooling sector and the second water cooling sector.

In the above coupling method, step (b) and step (c) may be performed in the reverse order for ease of operation and efficiency. Before step (c), the method may include a step of coupling a metal oxide before the adhesive layer becomes hardened after applying an inorganic adhesive to form an adhesive layer.

The cold crucible including a metal oxide barrier of the present invention can reduce the damage by a molten material on the edge of water cooling sectors thereby improving durability. Additionally, the metal oxide barrier enables easy replacement compared to conventional mica plates thus being useful for maintenance and repair.

The above embodiments are provided for the illustration of the present invention and the scope of the present invention is not limited to these embodiments. It will be apparent to those skilled in the art that various changes can be made therein without departing from the spirit and thus the technical scope of the present invention should be determined by the appended claims.

The invention claimed is:

1. A cold crucible induction melter comprising:
a barrier disposed between a first water cooling sector for forming a melting space in a cold crucible of a vitrification equipment and a second water cooling sector adjacent thereto, wherein:
the barrier has a T-shaped horizontal cross-section, in which a plate portion of the T-shaped horizontal cross-section is directed to the inside of the melting space, and a tip portion of the T-shaped horizontal cross-section is coupled by insertion between the water cooling sectors, and a material of the barrier comprises metal oxide; and
a mica plate disposed between the first water cooling sector and the second water cooling sector.

2. The cold crucible induction melter of claim 1, wherein a material of the barrier comprises at least one of $Al_2O_3$ and $ZrO_2$.

3. The cold crucible induction melter of claim 1, wherein the mica plate is disposed in a space between the first water cooling sector and the second water cooling sector, from an end of the metal oxide barrier to an outer end between the water cooling sectors and is attached to the adjacent water cooling sectors.

4. The cold crucible induction melter of claim 1, wherein the mica plate has a thickness of 0.1 mm to 1 mm, which is the same as or thicker than a thickness of the tip portion of the barrier.

5. The cold crucible induction melter of claim 1, further comprising an inorganic adhesive layer between the barrier and the water cooling sectors.

6. The cold crucible induction melter of claim 1, wherein a cooling water pathway is formed inside of the water cooling sectors.

7. The cold crucible induction melter of claim 1, wherein, in the barrier, a width (w) of the plate portion is in a range of 0.2 mm to 40 mm and a thickness (t2) of the plate portion is in a range of 0.1 mm to 5 mm.

8. The cold crucible induction melter of claim 1, wherein, in the barrier, a thickness (t1) of the tip portion is in a range of 0.1 mm to 1 mm and a length (h) of the tip portion is in a range of 0.1 mm to 20 mm.

9. The cold crucible induction melter of claim 1, wherein a horizontal cross-section of a corner portion of the barrier, where the tip portion and the plate portion of the barrier meet with each other, is in an outer arc shape having a radius in a range of 0.1 mm to 10 mm.

10. A method for coupling a metal oxide barrier between water cooling sectors, comprising:
preparing water cooling sectors of a first water cooling sector and a second water cooling sector;
attaching a mica plate to an outer part of the space between the first water cooling sector and the second water cooling sector with the mica plate disposed therebetween; and
inserting a barrier, wherein:
the barrier is a T-shaped metal oxide barrier; and
a tip portion of the barrier is inserted into an inner part of the space between the first water cooling sector and the second water cooling sector.

11. The method of claim 10, further comprising a step of applying an adhesive, in which an inorganic adhesive is applied to a tip portion of an oxide barrier and at least one selected from the inner parts of the space between the first water cooling sector and the second water cooling sector.

12. The method of claim 10, wherein a material of the barrier comprises at least one of $Al_2O_3$ and $ZrO_2$.

13. The method of claim 10, wherein the mica plate is disposed from an end of the metal oxide barrier to an outer end between the water cooling sectors and is attached to the adjacent water cooling sectors.

14. The method of claim 10, wherein the mica plate has a thickness of 0.1 mm to 1 mm, which is the same as or thicker than that of the tip portion of the barrier.

15. The method of claim 10, wherein a cooling water pathway is formed inside of the water cooling sectors.

16. The method of claim 10, wherein, in the barrier, the width (w) of a plate portion of the barrier is in a range of 0.2 mm to 40 mm and the thickness (t2) of the plate portion is in a range of 0.1 mm to 5 mm.

17. The method of claim 10, wherein a horizontal cross-section of a corner portion of the barrier is an outer arc shape having a radius in a range of 0.1 mm to 10 mm.

* * * * *